US011293403B2

(12) United States Patent
Cardinal et al.

(10) Patent No.: US 11,293,403 B2
(45) Date of Patent: Apr. 5, 2022

(54) SYSTEM AND METHOD FOR PREVENTING CATASTROPHIC DAMAGE IN DRIVETRAIN OF A WIND TURBINE

(71) Applicant: General Electric Company, Schenectady, NY (US)

(72) Inventors: Mark Edward Cardinal, Altamont, NY (US); Drake Joseph Viscome, Greenville, SC (US); Mathew Doyle Angel, Greenville, SC (US)

(73) Assignee: General Electric Company, Schenectady, NY (US)

( * ) Notice: Subject to any disclaimer, the term of this patent is extended or adjusted under 35 U.S.C. 154(b) by 311 days.

(21) Appl. No.: 16/378,808

(22) Filed: Apr. 9, 2019

(65) Prior Publication Data
US 2020/0325874 A1    Oct. 15, 2020

(51) Int. Cl.
*F03D 9/00* (2016.01)
*H02P 9/04* (2006.01)
(Continued)

(52) U.S. Cl.
CPC .......... *F03D 7/041* (2013.01); *F03D 7/0224* (2013.01); *H02P 9/00* (2013.01); *H02P 9/04* (2013.01);
(Continued)

(58) Field of Classification Search
CPC ... F03D 7/041; H02P 9/00; H02P 9/04; H02P 2101/15
See application file for complete search history.

(56) References Cited

U.S. PATENT DOCUMENTS 2,195,766 A * 4/1940 Courcoulas ............... H02P 9/00
   290/17
7,476,985 B2 * 1/2009 Llorente Gonzalez ......................
   F03D 7/042
   290/44
(Continued)

FOREIGN PATENT DOCUMENTS

CN    100593641 C    3/2010
CN    108386324 A    8/2018
(Continued)

OTHER PUBLICATIONS

European Search Report, dated Aug. 19, 2020, for EP Application No. 20168033.7.

*Primary Examiner* — Tulsidas C Patel
*Assistant Examiner* — Thomas K Quigley
(74) *Attorney, Agent, or Firm* — Dority & Manning, P.A.

(57) ABSTRACT

A method for preventing catastrophic damage in a drivetrain of a wind turbine includes receiving, via a controller, a speed measurement of the generator of the drivetrain. The method also includes determining an electrical torque of a generator of the drivetrain of the wind turbine. The method further includes estimating, via the controller, a mechanical torque of the rotor as a function of at least one of the electrical torque and the speed measurement of the generator. Further, the method includes comparing, via the controller, the estimated mechanical torque to an implausible torque threshold, wherein torque values above the implausible torque threshold speed values greater that the implausible speed threshold. Moreover, the method includes implementing, via the controller, a control action for the wind turbine when the estimated mechanical torque exceeds the implausible torque threshold.

19 Claims, 6 Drawing Sheets

(51) Int. Cl.
*F03D 7/04* (2006.01)
*F03D 7/02* (2006.01)
*H02P 9/00* (2006.01)
*H02P 101/15* (2016.01)

(52) U.S. Cl.
CPC ...... *F05B 2260/78* (2013.01); *H02P 2101/15* (2015.01)

(56) References Cited

U.S. PATENT DOCUMENTS

| | | | | |
|---|---|---|---|---|
| 9,062,653 | B2* | 6/2015 | Brath | F03D 7/042 |
| 9,688,284 | B2* | 6/2017 | Pongracz | B60W 50/0205 |
| 9,729,096 | B2* | 8/2017 | Edwards | F02C 9/28 |
| 9,745,958 | B2* | 8/2017 | Agarwal | F03D 7/0264 |
| 9,797,377 | B2* | 10/2017 | Bhaskar | F03D 9/257 |
| 9,866,160 | B2* | 1/2018 | Tan | H02P 9/007 |
| 9,920,743 | B2* | 3/2018 | Agarwal | F03D 1/0675 |
| 10,359,473 | B2* | 7/2019 | Qiao | F03D 17/00 |
| 10,428,792 | B2* | 10/2019 | Illing | F03D 7/041 |
| 10,781,792 | B2* | 9/2020 | Vaddi | F03D 7/0292 |
| 11,078,934 | B2* | 8/2021 | Caldwell | F15B 21/08 |
| 2003/0185665 | A1* | 10/2003 | Hansen | F03D 7/0256 |
| | | | | 415/1 |
| 2009/0263245 | A1* | 10/2009 | Shi | F03D 7/02 |
| | | | | 416/43 |
| 2011/0084485 | A1* | 4/2011 | Miranda | F03D 7/042 |
| | | | | 290/44 |
| 2012/0074698 | A1* | 3/2012 | Hearns | F03B 15/00 |
| | | | | 290/43 |
| 2012/0104754 | A1* | 5/2012 | Rudolf | F03D 7/042 |
| | | | | 290/44 |
| 2012/0241279 | A1* | 9/2012 | Graham | F16D 7/028 |
| | | | | 192/56.1 |
| 2013/0049733 | A1* | 2/2013 | Neti | F03D 7/0272 |
| | | | | 324/71.1 |
| 2013/0214535 | A1* | 8/2013 | Brath | F03D 7/042 |
| | | | | 290/44 |
| 2014/0346985 | A1* | 11/2014 | Magne | H02P 6/28 |
| | | | | 318/400.15 |
| 2015/0081192 | A1* | 3/2015 | Pongracz | B60W 50/0205 |
| | | | | 701/99 |
| 2015/0244296 | A1* | 8/2015 | Edwards | F01D 15/10 |
| | | | | 290/40 B |
| 2016/0010620 | A1* | 1/2016 | Han | F03B 15/12 |
| | | | | 290/43 |
| 2016/0017865 | A1* | 1/2016 | Illing | F03D 7/0224 |
| | | | | 416/1 |
| 2016/0033580 | A1* | 2/2016 | Qiao | F03D 7/0296 |
| | | | | 324/765.01 |
| 2017/0158348 | A1* | 6/2017 | Teubner | G05B 23/0235 |
| 2017/0276238 | A1* | 9/2017 | Lochocki, Jr. | F16H 61/12 |
| 2017/0284359 | A1* | 10/2017 | Burkle | H02K 35/02 |
| 2018/0245609 | A1* | 8/2018 | Caldwell | F03D 17/00 |
| 2019/0058425 | A1* | 2/2019 | De Rijcke | F03D 7/0272 |
| 2019/0063508 | A1* | 2/2019 | Harrington | G01B 21/16 |
| 2019/0263508 | A1* | 8/2019 | Crane | B64C 25/405 |
| 2019/0332958 | A1* | 10/2019 | Subhankar | G01M 13/021 |
| 2020/0325874 | A1* | 10/2020 | Cardinal | F03D 7/0288 |
| 2021/0246881 | A1* | 8/2021 | Priore, III | F03D 7/0204 |

FOREIGN PATENT DOCUMENTS

| | | |
|---|---|---|
| CN | 105673322 B | 9/2018 |
| CN | 108757340 A | 11/2018 |
| WO | WO2018/001434 A1 | 1/2018 |

\* cited by examiner

SYSTEM AND METHOD FOR PREVENTING CATASTROPHIC DAMAGE IN DRIVETRAIN OF A WIND TURBINE

FIELD

The present disclosure relates in general to wind turbines, and more particularly to systems and methods for preventing catastrophic damage in a drivetrain of a wind turbine.

BACKGROUND

Wind power is considered one of the cleanest, most environmentally friendly energy sources presently available, and wind turbines have gained increased attention in this regard. A modern wind turbine typically includes a tower, a nacelle mounted atop the tower, a rotor mounted to the nacelle having one or more rotor blades, and a drivetrain assembly within the nacelle. The drivetrain assembly typically includes various drivetrain components, such as a generator and a gearbox. The nacelle includes a rotor assembly coupled to the gearbox and to the generator. In many wind turbines, the generator and the gearbox are mounted to a bedplate within the nacelle via one or more torque arms. As such, the one or more rotor blades capture kinetic energy of wind using known airfoil principles. The rotor blades transmit the kinetic energy in the form of rotational energy so as to turn a shaft coupling the rotor blades to the gearbox, or if the gearbox is not used, directly to the generator. The generator then converts the mechanical energy to electrical energy that may be deployed to a utility grid.

Some wind turbines may include a low-speed resolution speed sensor and a high-resolution speed sensor, such as an encoder, on the generator for assessing rotor speed. The high-resolution speed sensor provides a high fidelity measurement of speed used to control the wind turbine. More specifically, a turbine controller may compare signals from the low-speed resolution speed sensor and the high-resolution speed sensor and determine a difference therebetween. If the difference is above a certain threshold for a certain amount of time, the controller will detect an issue (e.g. a damaged or broken drivetrain component) and initiate a shutdown procedure. Such a comparison may also indicate an issue between the sensors themselves. The control tightens the allowable deviation and time allowances with respect to power or some other machine parameter to increase or decrease the sensitivity of the comparison. The ability to timely detect a mismatch between the two sensors is limited by accuracy of the low precision sensor and the sampling rate or update rate of this sensor.

However, in the event that the drivetrain system or one of its components fails, the time to detect the failure and react may exceed the sensitivity of the comparison, thereby preventing the controller from detecting the failure for longer than desirable.

In view of the aforementioned issues, the art is continuously seeking new and improved systems and methods for preventing catastrophic damage in a wind turbine by detecting damage in the drivetrain sooner.

BRIEF DESCRIPTION

Aspects and advantages of the invention will be set forth in part in the following description, or may be obvious from the description, or may be learned through practice of the invention.

In one aspect, the present disclosure is directed to a method for preventing catastrophic damage in a drivetrain of a wind turbine. The drivetrain includes, at least, a rotor and a generator. The method includes receiving, via a controller, a speed measurement of the generator of the drivetrain. The method also includes determining an electrical torque of the generator. The method further includes estimating, via the controller, a mechanical torque of the rotor as a function of at least one of the electrical torque and the speed measurement. Further, the method includes comparing, via the controller, the estimated mechanical torque to an implausible torque threshold, wherein torque values above the implausible torque threshold are indicative of a failure of the drivetrain of the wind turbine. Moreover, the method includes implementing, via the controller, a control action for the wind turbine when the estimated mechanical torque exceeds the implausible torque threshold.

In one embodiment, the speed measurement of the generator may be measured via a high resolution speed sensor.

In another embodiment, determining the electrical torque of the generator may include at least one measuring the electrical torque of the generator via one or more sensors or estimating the electrical torque of the generator.

For example, in one embodiment, estimating the electrical torque of the generator may include measuring a power output of the generator and determining the electrical torque of the generator as a function of the power output and the speed of the generator.

In further embodiments, estimating the mechanical torque of the rotor as a function of at least one of the electrical torque and the speed measurement may include determining a speed error of the speed measurement of the generator and estimating, via a proportional controller, the mechanical torque as a function of the speed error.

In such embodiments, determining the speed error of the speed measurement of the generator may include determining a difference between the speed measurement of the generator and an estimate of a speed of the generator. As such, the speed error may correspond to a change in speed or acceleration required for the generator to accelerate or decelerate inertia of the drivetrain to maintain the speed measurement of the generator.

In additional embodiments, the method may further include comparing the speed error to an implausible speed threshold, wherein speeds greater that the implausible speed threshold are indicative of a failure of the drivetrain of the wind turbine.

In several embodiments, the method may also include determining a torque error as a difference between the electrical torque and the estimated mechanical torque and estimating the speed of the generator as a function of the torque error.

In particular embodiments, the method may include estimating the mechanical torque of the rotor as a function of the electrical torque, the speed measurement of the generator, and a friction coefficient of the generator.

In another embodiment, the control action for the wind turbine may include shutting down the wind turbine.

In another aspect, the present disclosure is directed to a drivetrain assembly of a wind turbine. The drivetrain assembly includes a main shaft for coupling to a rotor of the wind turbine, a gearbox coupled to the main shaft, a generator coupled to the gearbox, and a controller for controlling operation of the wind turbine. The controller includes at least one processor configured to perform a plurality of operations, the including but not limited to receiving a speed measurement of the generator of the drivetrain, determining an electrical torque of a generator of the drivetrain of the wind turbine, estimating a mechanical torque of the rotor as a function of at least one of the electrical torque and the speed measurement of the generator, comparing the estimated mechanical torque to an implausible torque threshold, wherein torque values above the implausible torque threshold are indicative of a failure of the drivetrain of the wind turbine, and implementing a control action for the wind turbine when the estimated mechanical torque exceeds the implausible torque threshold.

In yet another aspect, the present disclosure is directed to a method for preventing catastrophic damage in a drivetrain of a wind turbine. The method includes determining an electrical torque of a generator of the drivetrain. The method also includes receiving, from one or more sensors, a speed measurement of the generator. Further, the method includes determining, via a controller, a mechanical torque of a rotor of the wind turbine or an acceleration of the generator required to accelerate or decelerate inertia of the drivetrain to maintain the speed measurement. Moreover, when the mechanical torque and/or the acceleration exceed an implausible threshold, the method includes implementing a control action for the wind turbine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
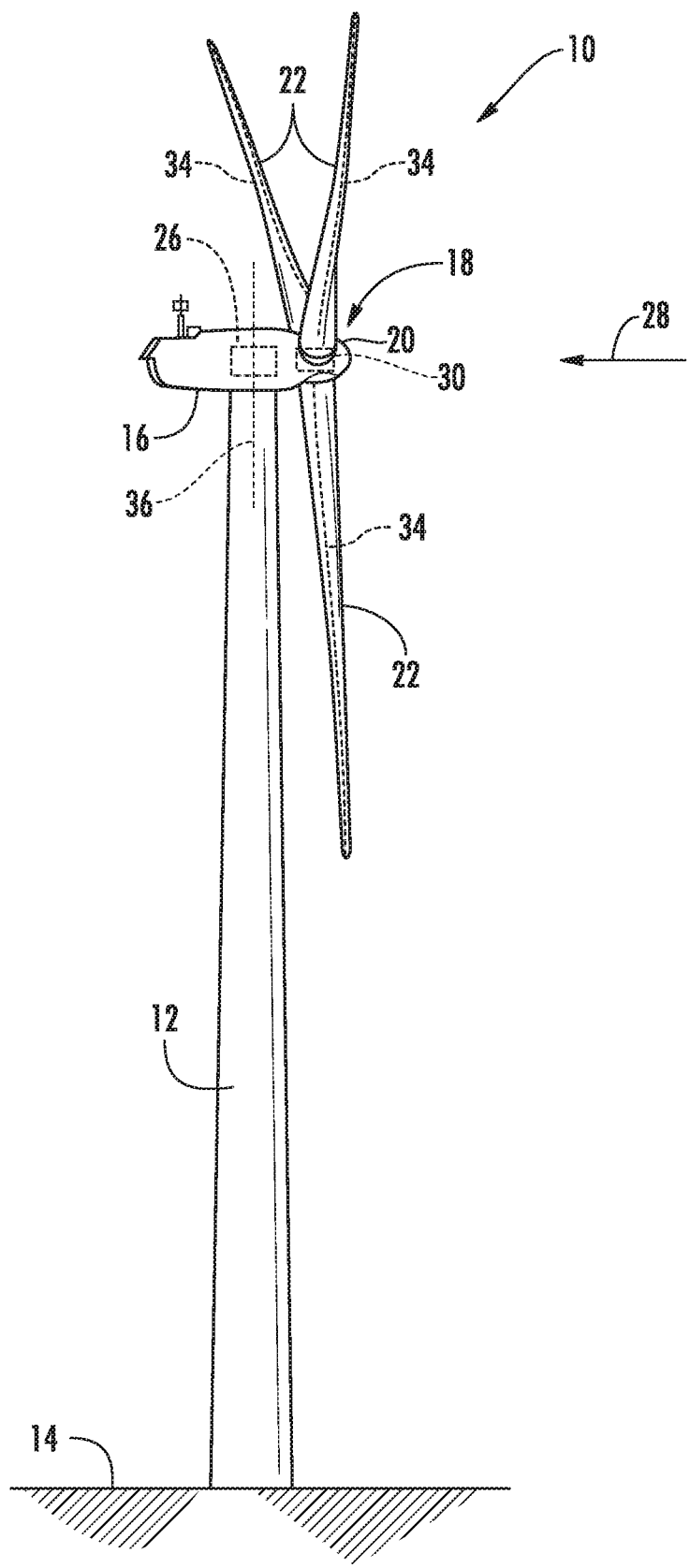
FIG. 1 illustrates a perspective view of a wind turbine according to one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
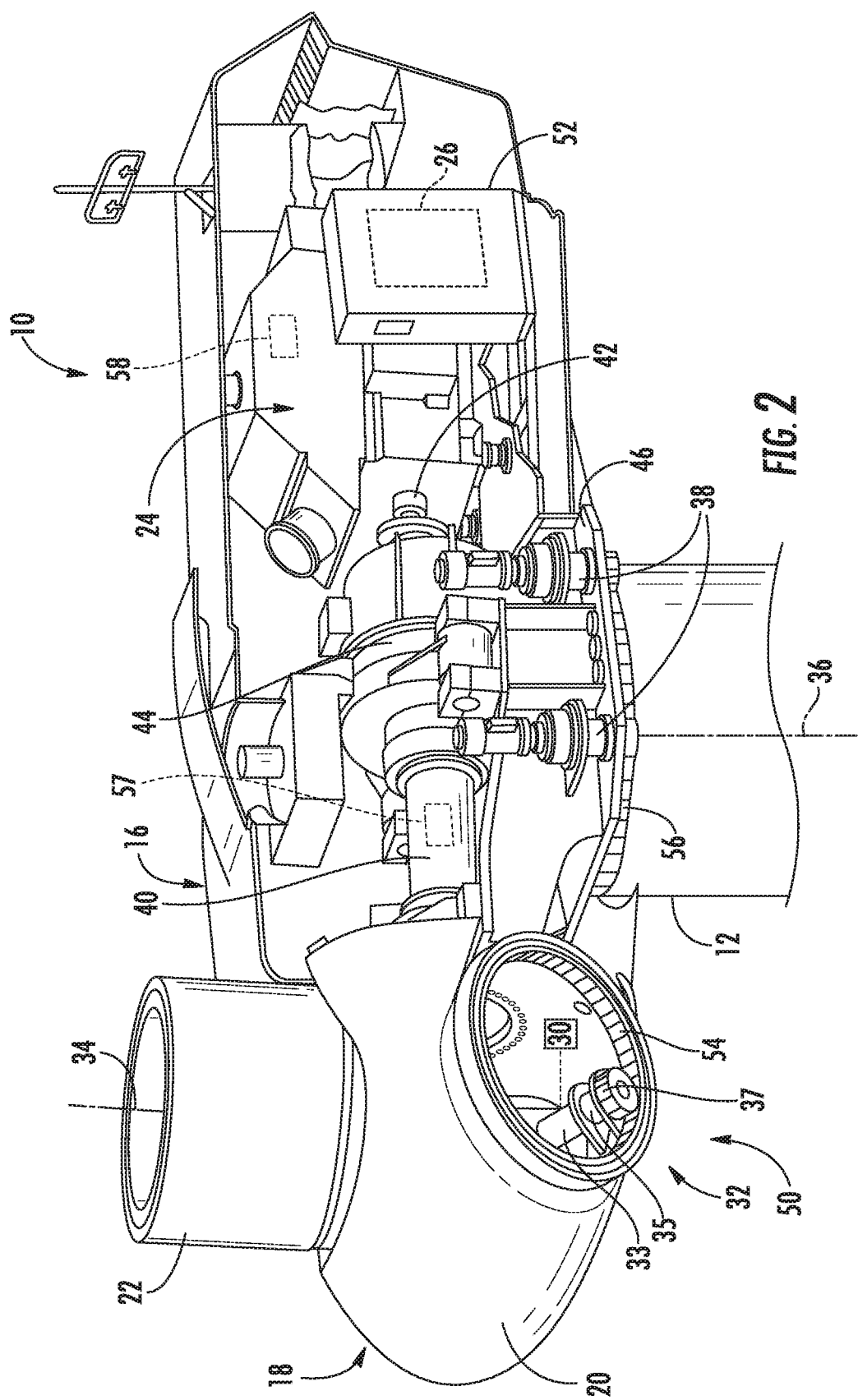
FIG. 2 illustrates a perspective, internal view of a nacelle of a wind turbine according to one embodiment of the present disclosure.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 40 coupled to the hub 20 for rotation therewith. The generator 24 may then be coupled to the main shaft 40 such that rotation of the main shaft 40 drives the generator 24. For instance, in the illustrated embodiment, the generator 24 includes a generator shaft 42 rotatably coupled to the main shaft 40 through a gearbox 44. However, in other embodiments, it should be appreciated that the generator shaft 42 may be rotatably coupled directly to the main shaft 40. Alternatively, the generator 24 may be directly rotatably coupled to the main shaft 40.

It should be appreciated that the main shaft 40 may generally be supported within the nacelle 16 by a support frame or bedplate 46 positioned atop the wind turbine tower 12. For example, the main shaft 40 may be supported by the bedplate 46 via a pair of pillow blocks mounted to the bedplate 46.

As shown in FIGS. 1 and 2, the wind turbine 10 may also include a turbine control system or a turbine controller 26 within the nacelle 16. For example, as shown in FIG. 2, the turbine controller 26 is disposed within a control cabinet 52 mounted to a portion of the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10.

As shown in FIG. 2, the wind turbine 10 may further a pitch system 50 that includes at least one pitch adjustment mechanism 32 for each of the rotor blades 22 that is configured to rotate each rotor blade 22 about its pitch axis 34. Further, each pitch adjustment mechanism 32 may include a pitch drive motor 33 (e.g., any suitable electric, hydraulic, or pneumatic motor), a pitch drive gearbox 35, and a pitch drive pinion 37. In such embodiments, the pitch drive motor 33 may be coupled to the pitch drive gearbox 35 so that the pitch drive motor 33 imparts mechanical force to the pitch drive gearbox 35. Similarly, the pitch drive gearbox 35 may be coupled to the pitch drive pinion 37 for rotation therewith. The pitch drive pinion 37 may, in turn, be in rotational engagement with a pitch bearing 54 coupled between the hub 20 and a corresponding rotor blade 22 such that rotation of the pitch drive pinion 37 causes rotation of the pitch bearing 54. Thus, in such embodiments, rotation of the pitch drive motor 33 drives the pitch drive gearbox 35 and the pitch drive pinion 37, thereby rotating the pitch bearing 54 and the rotor blade 22 about the pitch axis 34. Similarly, the wind turbine 10 may include one or more yaw drive mechanisms 38 communicatively coupled to the controller 26, with each yaw drive mechanism(s) 38 being configured to change the angle of the nacelle 16 relative to the wind (e.g., by engaging a yaw bearing 56 of the wind turbine 10).

Further, as shown, the turbine controller 26 may also be communicatively coupled to each pitch adjustment mechanism 32 of the wind turbine 10 through a separate or integral pitch controller 30 (FIG. 1) for controlling and/or altering the pitch angle of each respective rotor blade 22 (i.e., an angle that determines a perspective of the rotor blades 22 with respect to the direction 28 of the wind).

In addition, as shown in FIG. 2, one or more sensors 57, 58 may be provided on the wind turbine 10. More specifically, as shown, a shaft sensor 57 may be communicatively coupled with the main shaft 40 and/or the rotor 18 to monitor the speed thereof. Further, as shown, a generator sensor 58 may be communicatively coupled with the generator 24 to monitor the speed thereof. As such, the sensors 57, 58 may further be in communication with the controller 26, and may provide related information to the controller 26.

It should also be appreciated that, as used herein, the term "monitor" and variations thereof indicates that the various sensors of the wind turbine 10 may be configured to provide a direct measurement of the parameters being monitored and/or an indirect measurement of such parameters. Thus, the sensors described herein may, for example, be used to generate signals relating to the parameter being monitored, which can then be utilized by the controller 26 to determine the condition.

Figure 3:
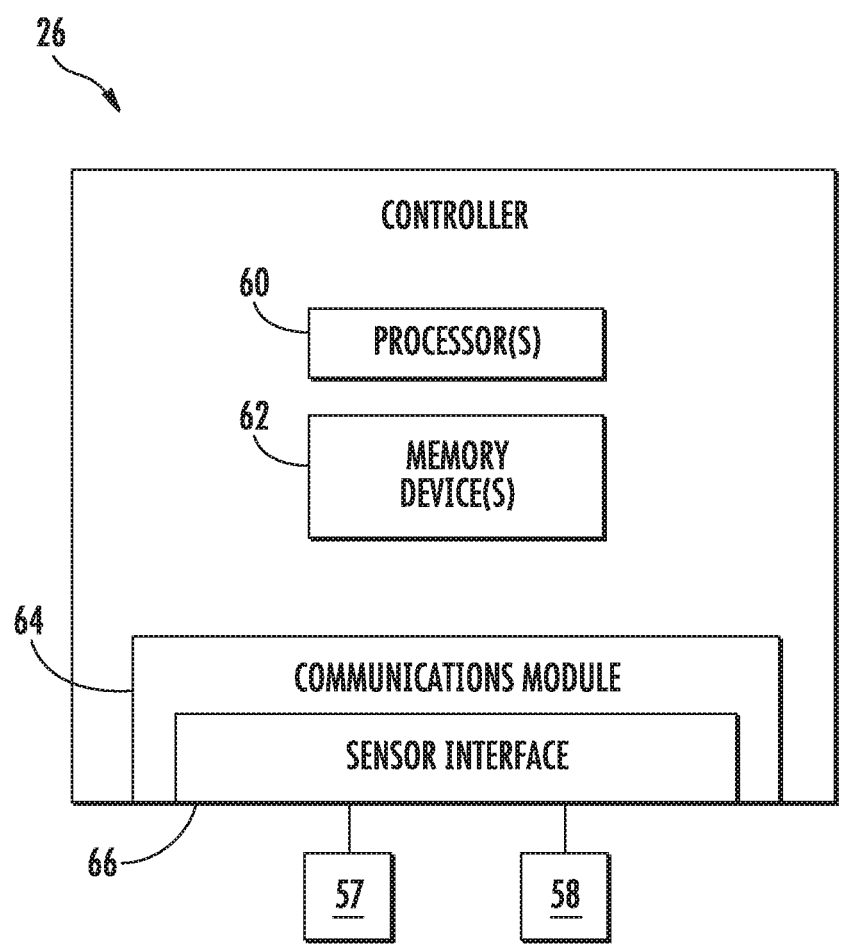
FIG. 3 illustrates a schematic diagram of one embodiment of suitable components that may be included in a wind turbine controller according to the present disclosure.

Referring now to FIG. 3, there is illustrated a block diagram of one embodiment of suitable components that may be included within the controller 26 according to the present disclosure. As shown, the controller(s) 26 may include one or more processor(s) 60 and associated memory device(s) 62 configured to perform a variety of computer-implemented functions (e.g., performing the methods, steps, calculations and the like and storing relevant data as disclosed herein). Additionally, the controller(s) 26 may also include a communications module 64 to facilitate communications between the controller(s) 26 and the various components of the wind turbine 10. Further, the communications module 64 may include a sensor interface 66 (e.g., one or more analog-to-digital converters) to permit signals transmitted from one or more sensors 57, 58 to be converted into signals that can be understood and processed by the processors 60. It should be appreciated that the sensors 57, 58 may be communicatively coupled to the communications module 64 using any suitable means. For example, as shown in FIG. 3, the sensors 57, 58 are coupled to the sensor interface 66 via a wired connection. However, in other embodiments, the sensors 57, 58 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller(s) 26 to perform various functions including, but not limited to, transmitting suitable control signals to implement corrective action(s) in response to a distance signal exceeding a predetermined threshold as described herein, as well as various other suitable computer-implemented functions.

Figure 4:
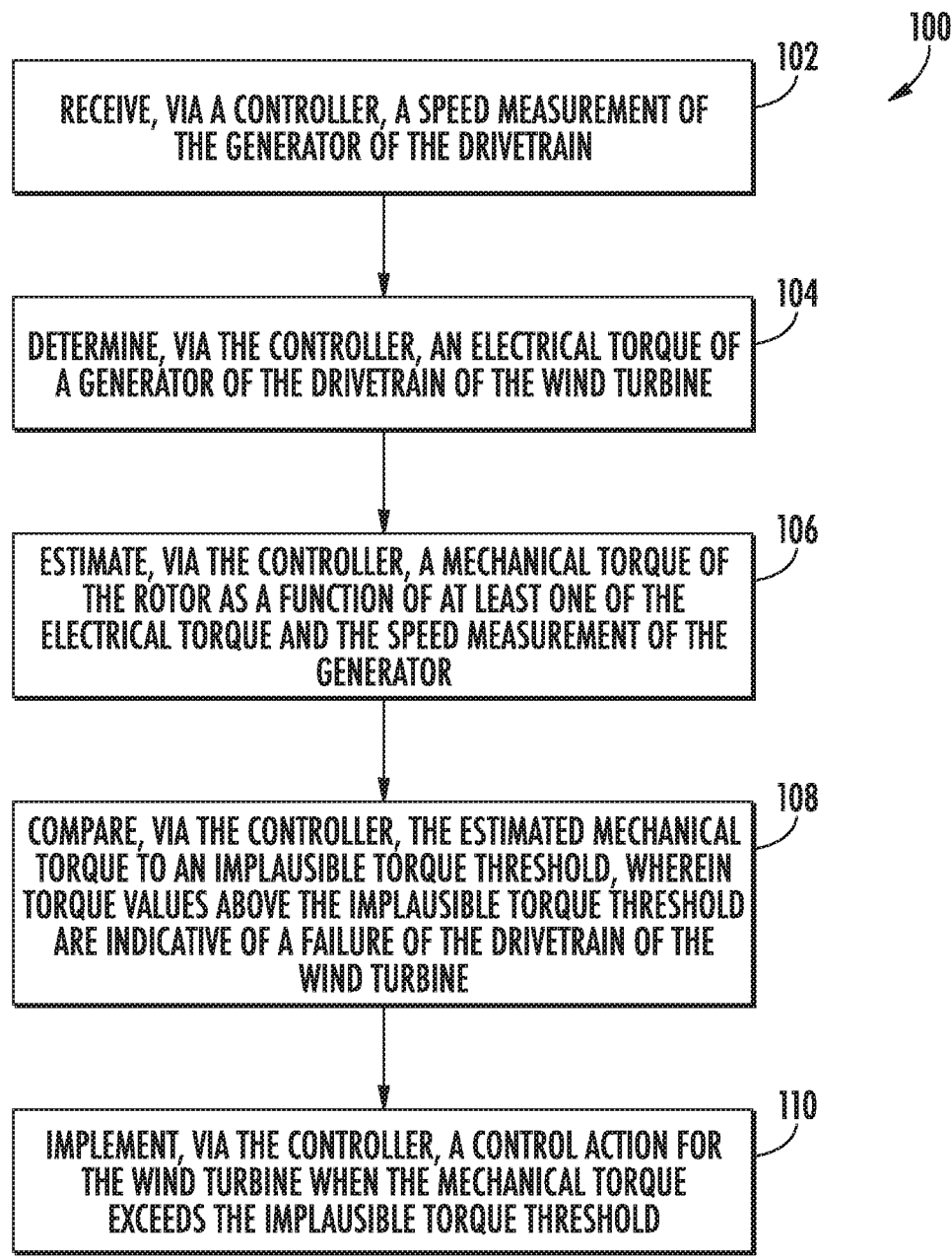
FIG. 4 illustrates a flow diagram of one embodiment of a method for preventing catastrophic damage in a drivetrain of a wind turbine according to the present disclosure.

Referring now to FIG. 4, a flow diagram of one embodiment of a method 100 for preventing catastrophic damage or by detecting failures in a drivetrain of a wind turbine is illustrated. The method 100 may be implemented using, for instance, the wind turbine 10 and the controller 26 discussed above with reference to FIGS. 1-3. FIG. 4 depicts steps performed in a particular order for purposes of illustration and discussion. Those of ordinary skill in the art, using the disclosures provided herein, will understand that various steps of the method 100 or any of the other methods disclosed herein may be adapted, modified, rearranged, performed simultaneously or modified in various ways without deviating from the scope of the present disclosure.

As shown at (102), the method 100 includes receiving a speed measurement of the generator 24 of the drivetrain, e.g. via the controller 26. In one embodiment, the speed measurement may be measured via a high resolution speed sensor, such as the generator sensor 58.

As shown at (104), the method 100 includes determining an electrical torque of the generator 24 of the drivetrain of the wind turbine 10. For example, in one embodiment, the electrical torque of the generator 24 may be determined by measuring the electrical torque of the generator 24 via one or more sensors.

Additionally or alternatively, the electrical torque of the generator 24 may be determined by estimating the electrical torque (e.g. $T_{ELEC}$) of the generator 24. For example, in one embodiment, the controller 26 may estimate the electrical torque of the generator 24 by measuring a power output of the generator 24 and determining the electrical torque of the generator 24 as a function of the power output and the speed of the generator 24. More specifically, the controller 26 may use the known relationship of torque (T), power (P), and speed ($\omega$) as shown in Equation (1) below to determine the electrical torque.

$$T = P/\omega \qquad \text{Equation (1)}$$

Referring still to FIG. 4, as shown at (106), the method 100 also includes estimating, via the controller 26, a mechanical torque of the rotor 18 as a function of the electrical torque and/or the speed measurement of the generator 24. In certain embodiments, the method 100 may include estimating the mechanical torque of the rotor 18 as a function of the electrical torque, the speed measurement of the generator 24, and a friction coefficient (e.g. $\mu_f$) of the generator 24.

Figure 5:
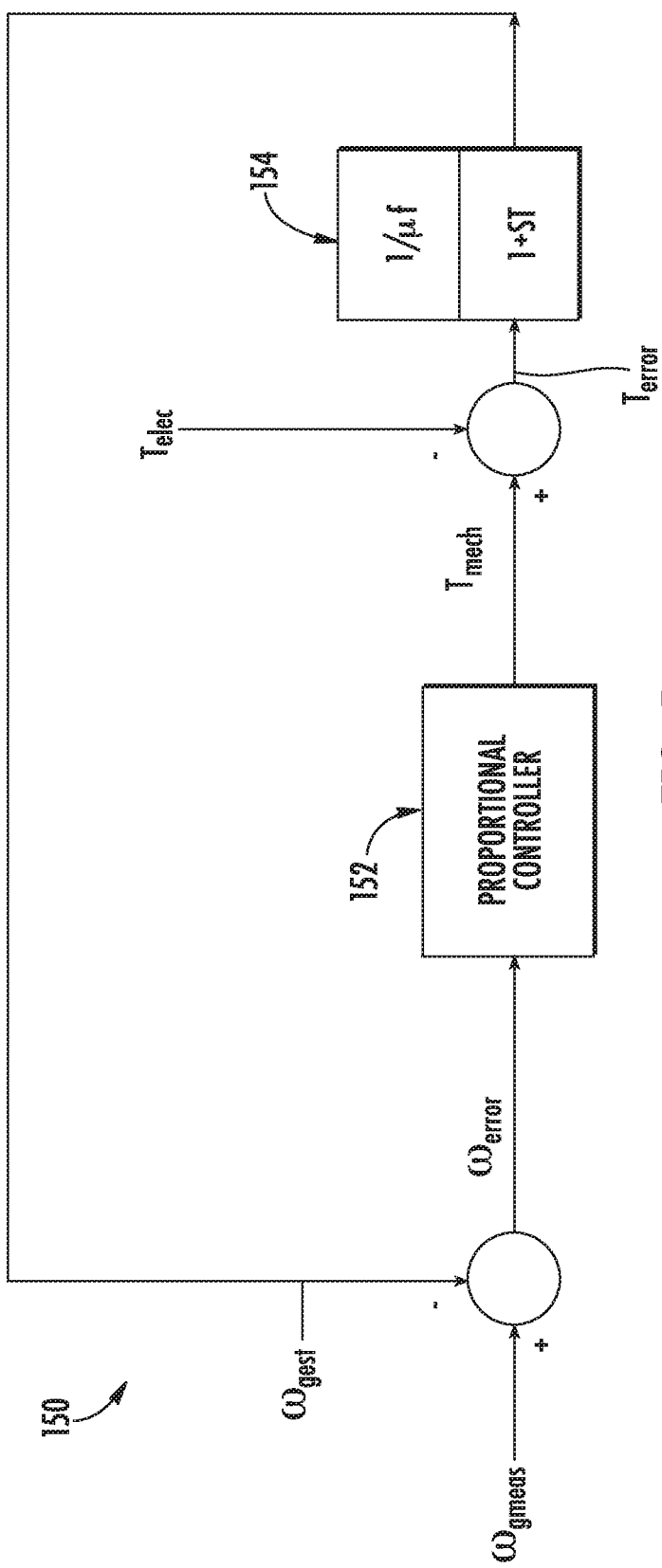
FIG. 5 illustrates a schematic diagram of one embodiment of a system for preventing catastrophic damage in a drivetrain of a wind turbine according to the present disclosure and FIG. 6 illustrates a flow diagram of another embodiment of a method for preventing catastrophic damage in a drivetrain of a wind turbine according to the present disclosure.

In addition, the estimation of the mechanical torque $T_{MECH}$ can be better understood with reference to FIG. 5, which is provided for example purposes only and is not meant to be limited. More specifically, as shown, FIG. 5 illustrates a schematic diagram of one embodiment of a system 150 for preventing catastrophic damage or failures in the drivetrain of the wind turbine according to the present disclosure. As shown, in one embodiment, the controller 26 may estimate the mechanical torque $T_{MECH}$ of the generator 24 by determining a speed error (e.g. $\omega_{ERROR}$) of the speed measurement (e.g. $\omega_{Gmeas}$) of the generator 24 and the modeled system. In such embodiments, as shown, the controller 26 may determine the speed error $\omega_{ERROR}$ of the speed measurement of the generator 24 by determining a difference between the speed measurement $\omega_{Gmeas}$ of the generator 24 and an estimate of a speed (e.g. $\omega_{Gest}$) of the generator 24.

In addition, as shown, the controller 26 may utilize a proportional controller 152 to estimate the mechanical torque $T_{MECH}$ as a function of the speed error $\omega_{ERROR}$. It should be understood that the proportional controller 152 described herein may include a proportional (P) controller, a proportional integral (PI) controller, a proportional derivative (PD) controller, a proportional integral derivative (PID) controller, or similar. As such, the speed error $\omega_{ERROR}$ may correspond to a change in speed or acceleration required for the generator 24 to accelerate or decelerate inertia of the drivetrain to maintain the speed measurement of the generator 24.

The estimated mechanical torque $T_{MECH}$ can then be used, along with the electrical torque $T_{ELEC}$ to determine a torque error (e.g. $T_{ERROR}$). More specifically, as shown, the torque error $T_{ERROR}$ may be calculated as a difference between the electrical torque $T_{ELEC}$ and the estimated mechanical torque $T_{MECH}$. Thus, as shown, the controller 26 may also include a computer-implemented model 154 for estimating the speed $\omega_{Gest}$ of the generator 24 as a function of the torque error $T_{ERROR}$. For example, in certain embodiments, the model 154 may operate according to the relationship provided in Equation (2) below:

$$Ja = T_{MECH} - T_{ELEC} - \mu_f \omega_{Gest} \qquad \text{Equation (2)}$$

where $T_{MECH} - T_{ELEC}$ is equal to $T_{ERROR}$,
J is the inertia of the wind turbine 10, and
a is the acceleration of the generator 24.

Thus, as shown in FIG. 5, in one embodiment, the model 154 may generate an output (e.g. the speed $\omega_{Gest}$) by using the Laplace transform of Equation (2) and simplifying Equation (2) as shown in Equation (3) below:

$$(1/\mu_f)(T_{ERROR})/(1+sT) \qquad \text{Equation (3)}$$

where T is a time constant represented by $J/\mu_f$.

Referring back to FIG. 4, as shown at (108), the method 100 includes comparing, via the controller 26, the estimated mechanical torque to an implausible torque threshold. As such, torque values above the implausible torque threshold may be indicative of a failure of the drivetrain of the wind turbine. In one embodiment, torque values above the implausible torque threshold may result in excessive loading of the wind turbine 10 greater than an allowed extreme loading of the wind turbine 10. In other words, as used herein, "an implausible torque threshold" generally refers to an unattainable torque value that cannot be realistically achieved, therefore, the only logical conclusion is that one or more drivetrains components is damaged or has failed.

In additional embodiments, the method 100 may also include comparing the speed error $\omega_{ERROR}$ to an implausible speed threshold. In such embodiments, speed values greater that the implausible speed threshold may also be indicative of a failure of the drivetrain of the wind turbine. In one embodiment, for example, speed values greater that the implausible speed threshold may result in excessive loading of the wind turbine 10 greater than an allowed extreme loading of the wind turbine 10. Thus, as used herein, "an implausible speed threshold" generally refers to an unattainable speed or change in speed value that cannot be realistically achieved, therefore, the only logical conclusion is that one or more drivetrains components is damaged or has failed. In other words, as an example, if a load is being applied on the generator 24 and a mechanical fuse or coupling breaks or fails, then the generator speed will quickly change. Therefore, the abrupt change in speed of the generator 24 is indicative of component failure.

Referring still to FIG. 5, as shown at (110), the method 100 includes implementing, via the controller 26, a control action for the wind turbine 10 when the estimated mechanical torque exceeds the implausible torque threshold. For example, in one embodiment, the control action for the wind turbine 10 may include shutting down the wind turbine 10 such that a repair procedure can take place and/or such that catastrophic damage can be prevented.

Figure 6:
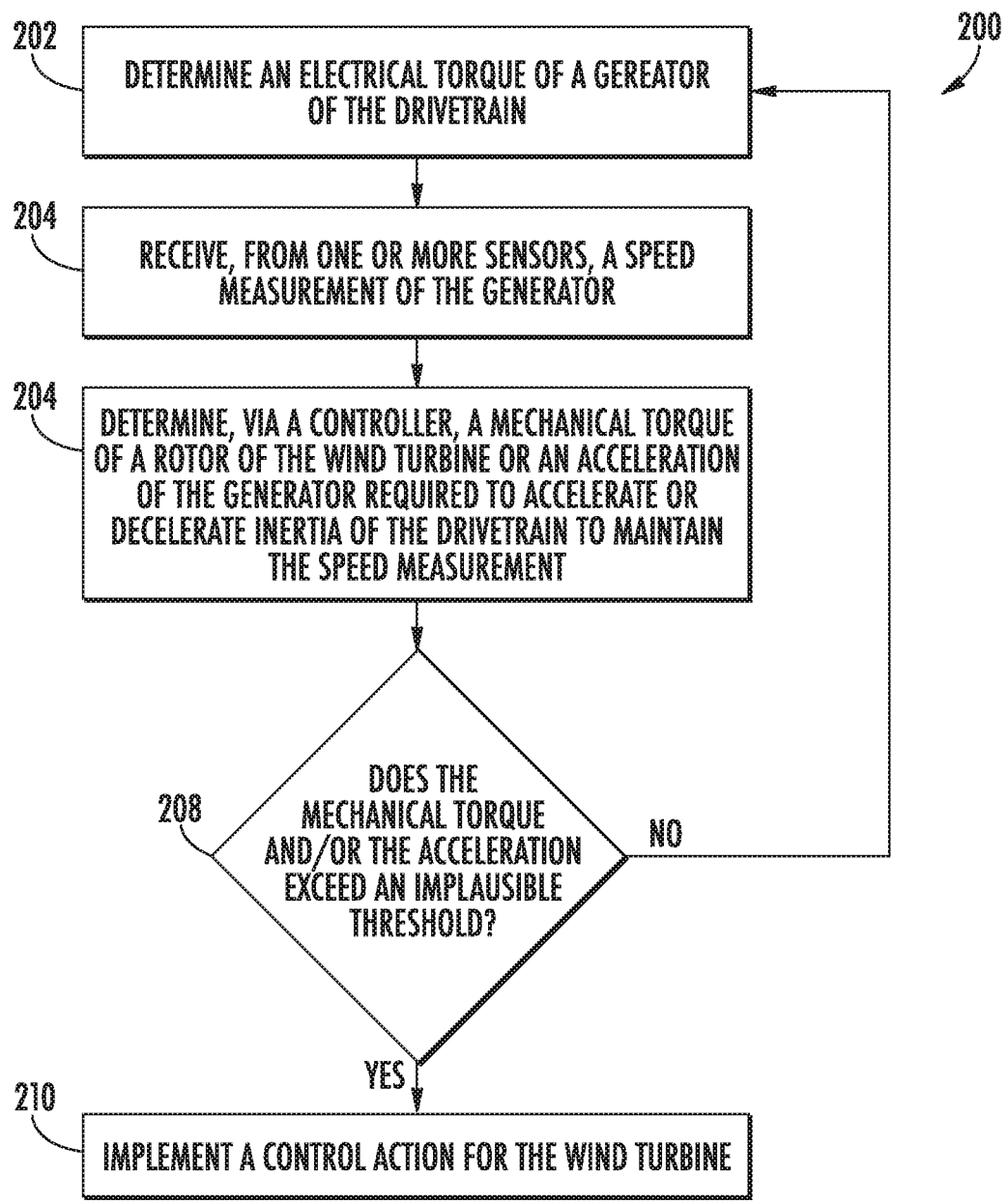

Referring now to FIG. 6, a flow diagram of one embodiment of a method 200 for preventing catastrophic damage or failures in a drivetrain of a wind turbine is illustrated. The method 200 may be implemented using, for instance, the wind turbine 10 and the controller 26 discussed above with reference to FIGS. 1-3. FIG. 6 depicts steps performed in a particular order for purposes of illustration and discussion. Those of ordinary skill in the art, using the disclosures provided herein, will understand that various steps of the method 200 or any of the other methods disclosed herein may be adapted, modified, rearranged, performed simultaneously or modified in various ways without deviating from the scope of the present disclosure.

As shown at (202), the method 200 includes determining an electrical torque of the generator 24 of the drivetrain. As shown at (204), the method 200 includes receiving, from one or more sensors (such as generator sensor(s) 58), a speed measurement of the generator 24. As shown at (206), the method 200 includes determining, via the controller 26, a mechanical torque of the rotor 18 of the wind turbine 10 or an acceleration of the generator 24 required to accelerate or decelerate inertia of the drivetrain to maintain the speed measurement. As shown at (208), the method 200 includes determining whether the mechanical torque and/or the acceleration exceed an implausible threshold. If so, as shown at (210), the method 200 includes implementing a control action for the wind turbine 10, such as shutting down the wind turbine 10.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for preventing catastrophic damage in a drivetrain of a wind turbine, the drivetrain having, at least, a rotor and a generator, the method comprising:
   receiving, via a controller, a speed measurement of the generator;
   determining, via the controller, an electrical torque of the generator;
   estimating, via the controller, a mechanical torque of the rotor as a function of at least one of the electrical torque and the speed measurement;
   comparing, via the controller, the estimated mechanical torque to an implausible torque threshold, wherein torque values above the implausible torque threshold are indicative of a failure of the drivetrain of the wind turbine; and,
   implementing, via the controller, a control action for the wind turbine when the estimated mechanical torque exceeds the implausible torque threshold, wherein the control action comprises shutting down the wind turbine.

2. The method of claim 1, wherein the speed measurement is measured via a high resolution speed sensor.

3. The method of claim 1, wherein determining the electrical torque of the generator of the drivetrain further comprises at least one of measuring the electrical torque of the generator via one or more sensors or estimating the electrical torque of the generator.

4. The method of claim 3, wherein estimating the electrical torque of the generator further comprises:
   measuring a power output of the generator; and,
   determining the electrical torque of the generator as a function of the power output and the speed of the generator.

5. The method of claim 1, wherein estimating the mechanical torque of the rotor as a function of at least one of the electrical torque and the speed measurement further comprises:
   determining a speed error of the speed measurement of the generator; and,
   estimating, via the controller, the mechanical torque as a function of the speed error.

6. The method of claim 5, wherein determining the speed error of the speed measurement of the generator further comprises:
   determining a difference between the speed measurement of the generator and an estimate of a speed of the generator.

7. The method of claim 6, wherein the speed error comprises a change in speed required for the generator to accelerate or decelerate inertia of the drivetrain to maintain the speed measurement of the generator.

8. The method of claim 7, further comprising comparing the speed error to an implausible speed threshold, wherein speeds greater than the implausible speed threshold are indicative of a failure of the drivetrain of the wind turbine.

9. The method of claim 6, further comprising:
   determining a torque error as a difference between the electrical torque and the estimated mechanical torque; and
   estimating the speed of the generator as a function of the torque error.

10. The method of claim 1, further comprising estimating the mechanical torque of the rotor as a function of the electrical torque, the speed measurement of the generator, and a friction coefficient of the generator.

11. A drivetrain assembly of a wind turbine, the drivetrain assembly comprising:
    a main shaft for coupling to a rotor of the wind turbine;
    a gearbox coupled to the main shaft;
    a generator coupled to the gearbox; and,
    a controller for controlling operation of the wind turbine, the controller comprises at least one processor, the at least one processor configured to perform a plurality of operations, the plurality of operations comprising:
      receiving a speed measurement of the generator of the drivetrain;
      determining an electrical torque of a generator of the drivetrain of the wind turbine;
      estimating a mechanical torque of the rotor as a function of at least one of the electrical torque and the speed measurement of the generator;
      comparing the estimated mechanical torque to an implausible torque threshold wherein torque values above the implausible torque threshold are indicative of a failure of the drivetrain of the wind turbine; and,
      implementing a control action for the wind turbine when the estimated mechanical torque exceeds the implausible torque threshold, wherein the control action comprises shutting down the wind turbine.

12. The drivetrain assembly of claim 11, further comprising a high resolution speed sensor for measuring the speed measurement.

13. The drivetrain assembly of claim 11, wherein determining the electrical torque of the generator of the drivetrain further comprises at least one of measuring the electrical torque of the generator via one or more sensors or estimating the electrical torque of the generator.

14. The drivetrain assembly of claim 13, wherein estimating the mechanical torque of the rotor as a function of at least one of the electrical torque and the speed measurement further comprises:
    determining a speed error of the speed measurement of the generator; and,
    estimating, via the controller, the mechanical torque as a function of the speed error.

15. The drivetrain assembly of claim 14, wherein determining the speed error of the sped measurement of the generator further comprises:
    determining a difference between the speed measurement of the generator and an estimate of a speed of the generator.

16. The drivetrain assembly of claim 15, wherein the speed error comprises a change in speed required for the generator to accelerate or decelerate inertia of the drivetrain to maintain the speed measurement of the generator.

17. The drivetrain assembly of claim 16, further comprising comparing the speed error to an implausible speed threshold, wherein speeds greater than the implausible speed threshold are indicative of a failure of the drivetrain of the wind turbine.

18. The drivetrain assembly of claim 15, further comprising:
- determining a torque error as a difference between the electrical torque and the estimated mechanical torque; and
- estimating the speed of the generator as a function of the torque error.

19. A method for preventing catastrophic damage in a drivetrain of a wind turbine, the drivetrain having, at least, a rotor and a generator, the method comprising:
- determining an electrical torque of the generator of the drivetrain;
- receiving, from one or more sensors, a speed measurement of the generator;
- determining, via a controller, a mechanical torque of a rotor of the wind turbine, or an acceleration of the generator required to accelerate or decelerate inertia of the drivetrain, to maintain the speed measurement based, at least in part, on the determined electrical torque of the generator of the drivetrain or the speed measurement of the generator of the drivetrain; and,
- when the mechanical torque and/or the acceleration exceed an implausible threshold, implementing a control action for the wind turbine, wherein the control action comprises shutting down the wind turbine.

* * * * *